United States Patent
Murphy et al.

(10) Patent No.: US 9,122,770 B2
(45) Date of Patent: Sep. 1, 2015

(54) SYSTEM AND METHOD FOR CREATING, MANAGING, AND REUSING SCHEMA TYPE DEFINITIONS IN SERVICES ORIENTED ARCHITECTURE SERVICES, GROUPED IN THE FORM OF LIBRARIES

(71) Applicant: eBay Inc., San Jose, CA (US)

(72) Inventors: Ronald Francis Murphy, Pleasanton, CA (US); Sastry K. Malladi, Fremont, CA (US); Weian Deng, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/470,522

(22) Filed: Aug. 27, 2014

(65) Prior Publication Data

US 2015/0088892 A1 Mar. 26, 2015

Related U.S. Application Data

(63) Continuation of application No. 13/969,345, filed on Aug. 16, 2013, now Pat. No. 8,856,732, which is a continuation of application No. 12/692,015, filed on Jan. 22, 2010, now Pat. No. 8,516,437.

(51) Int. Cl.
*G06F 9/44* (2006.01)
*G06F 17/30* (2006.01)
*G06F 9/45* (2006.01)

(52) U.S. Cl.
CPC ............ *G06F 17/30923* (2013.01); *G06F 8/20* (2013.01); *G06F 8/30* (2013.01); *G06F 8/41* (2013.01); *G06F 9/4428* (2013.01); *G06F 17/30292* (2013.01)

(58) Field of Classification Search
CPC .................................... G06F 8/30; G06F 8/41
USPC .................................................. 717/106, 140
See application file for complete search history.

(56) References Cited

U.S. PATENT DOCUMENTS

| | | | |
|---|---|---|---|
| 7,434,157 B2 * | 10/2008 | Little et al. | 715/234 |
| 7,698,398 B1 * | 4/2010 | Lai | 709/223 |
| 2002/0184401 A1 * | 12/2002 | Kadel et al. | 709/315 |
| 2003/0167444 A1 * | 9/2003 | Zorc | 715/513 |

OTHER PUBLICATIONS

K. Kadioglu, "Design and Implementation of a Plug-In Framework for Distributed Object Technologies", 2006.*

* cited by examiner

*Primary Examiner* — Phillip H Nguyen
(74) *Attorney, Agent, or Firm* — Schwegman Lundberg & Woessner, P.A.

(57) ABSTRACT

A computer-implemented system and method for creating, managing, and reusing schema type definitions in SOA services, grouped in the form of libraries are disclosed. The method in an example embodiment includes: grouping a plurality of Extensible Mark-up Language (XML) schema (XSD) types, each XSD type defined in an individual XSD file; using a processor to bundle the plurality of individual XSD types into a type library, the type library including a type information file to register the individual XSD types in the type library, the type library further including a type dependencies file to register dependencies between the individual XSD types in the same or different type library; importing types from a different type library, when defining derived types or aggregated types; generating Java artifacts from the XSD types; and associating the Java artifacts with corresponding XSD types in the type information file of the type library.

20 Claims, 16 Drawing Sheets

Type Library Creation

Type Library Type Definition

Type Library Building

Service Building

Service Building

SOA Tool Interaction

Namespace Mapping

SYSTEM AND METHOD FOR CREATING, MANAGING, AND REUSING SCHEMA TYPE DEFINITIONS IN SERVICES ORIENTED ARCHITECTURE SERVICES, GROUPED IN THE FORM OF LIBRARIES

RELATED APPLICATION

This application is a continuation of U.S. patent application Ser. No. 13/969,345, filed Aug. 16, 2013, which is a continuation of U.S. patent application Ser. No. 12/692,105, filed Jan. 22, 2010, the benefit of priority of each of which is claimed hereby, and each are incorporated herein by reference in their entirety.

COPYRIGHT NOTICE

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008-2009, eBay Inc., All Rights Reserved.

BACKGROUND

1. Technical Field

This disclosure relates to methods and systems supporting computing and data processing systems. Specifically, the disclosure relates to creating, managing, and reusing schema type definitions in Services Oriented Architecture (SOA) services, grouped in the form of libraries. Schema types are defined using Extensible Mark-up Language (XML).

2. Related Art

In Services Oriented Architecture (SOA), there are typically many communicating reusable services that are deployed in several machines. In large-scale enterprises, like host, eTrade, or Google for example, there could be thousands of different services deployed in thousands of machines. It is most common and efficient for these automated services to communicate with each other. Further, external access is also typically provided for some of these services. In communicating with each other, various different types of communication protocols may be used for efficiently and optimization reasons. Communication between service providers and service consumers can be accomplished using some pre-defined protocol. In the web services case, this protocol can be the Simple Object Access Protocol (SOAP). SOAP is a protocol for exchanging Extensible Mark-up Language (XML)-based messages over computer networks, normally using Hypertext Transport Protocol (HTTP/HTTPS).

XML is becoming increasingly popular as the format for describing and storing all forms of data, including message and interface formats for SOA services. Thus, providing support for storing, searching and manipulating XML type definition is an extremely important problem to address for SOA services. Information about the structure of specific data types may be specified in documents referred to as "XML schemas". An XML schema is a description of a type of XML document, typically expressed in terms of constraints on the structure and content of documents of that type, above and beyond the basic syntactical constraints imposed by XML itself. An XML schema provides a view of the document type at a relatively high level of abstraction. For example, the XML schema for a particular type of XML document may specify the names for the data elements contained in that particular type of XML document, the hierarchical relationship between the data elements contained in that type of XML document, data types of the data elements contained in that particular type of XML document, etc.

U.S. Pat. No. 7,434,157 describes a programmable object model that allows a user to programmatically access and utilize a Namespace or schema library containing XML schema files and related XML-based resources for associating the schema files and XML-based resources with one or more documents and for customizing the functionality associated with the schema files and XML-based resources. The programmable object model also allows the user/programmer to remove schema files and other XML-based resources from association with previously associated documents.

U.S. Patent Application No. 2003/0115548 describes techniques for programmatically generating class libraries to represent the messages which may be sent/received according to specifications provided in a structured language message definition schema (or its equivalent, alternatively, such as a Document Type Definition or "DTD"). The disclosed techniques are very flexible, and are not limited to a single output programming language. Instead, a template-driven approach can be used to guide the generation process, where templates for multiple programming languages may be used to generate different versions of a class library, one for each programming language. The generation process can also be directed by rules specified in a rules file. The disclosed techniques can be used to generate class libraries for web services which have a service interface defined using only a schema reference. Migration can be evaluated programmatically, enabling much easier resolution of migration issues than is possible using prior art manual migration techniques.

U.S. Pat. No. 7,096,224 describes a method and system for allowing users to register XML schemas in a database system. The database system determines, based on a registered XML schema, how to store within the database system XML documents that conform to the XML schema. This determination involves mapping constructs defined in the XML schema to constructs supported by the database system. Such constructs may include datatypes, hierarchical relationship between elements, constraints, inheritances, etc. Once the mapping has been determined, it is stored and used by the database system to determine how to store subsequently received XML documents that conform to the registered XML schema.

U.S. Pat. No. 7,003,722 describes a method and system for converting a hierarchical data structure into a flat data structure based on a schema. The format of the hierarchical data structure may be XML. A hierarchical data structure conforming to a schema is loaded into an application program. The data structure includes elements and attributes linked together in a parent-child relationship. The schema defines the hierarchical relationships between the elements and attributes in the hierarchical data structure. After the hierarchical data structure conforming to the schema has been loaded, a plurality of layout rules is applied to the hierarchical data based on the schema to create a flat data structure. The layout rules determine how the hierarchical data will be inserted in the flat data structure. The layout rules may be applied by identifying properties in the schema which identify occurrence requirements for elements defined in the schema. After the layout rules have been applied to the hierarchical data, the hierarchical data is rendered into a spreadsheet by inserting the data in rows and columns.

Service development is interface-based (e.g., Web Services Description Language—WSDL) and the interface in turn depends on the data types used for requests and responses. In order to effectively support service re-use and version management, the underlying data types need to be managed properly. Conventional systems have not addressed this adequately.

Thus, a computer-implemented system and method for creating, managing, and reusing schema type definitions in SOA services, grouped in the form of libraries is needed.

BRIEF DESCRIPTION OF THE DRAWINGS

Embodiments illustrated by way of example and not limitation in the figures of the accompanying drawings, in which.

DETAILED DESCRIPTION

Figure 1:
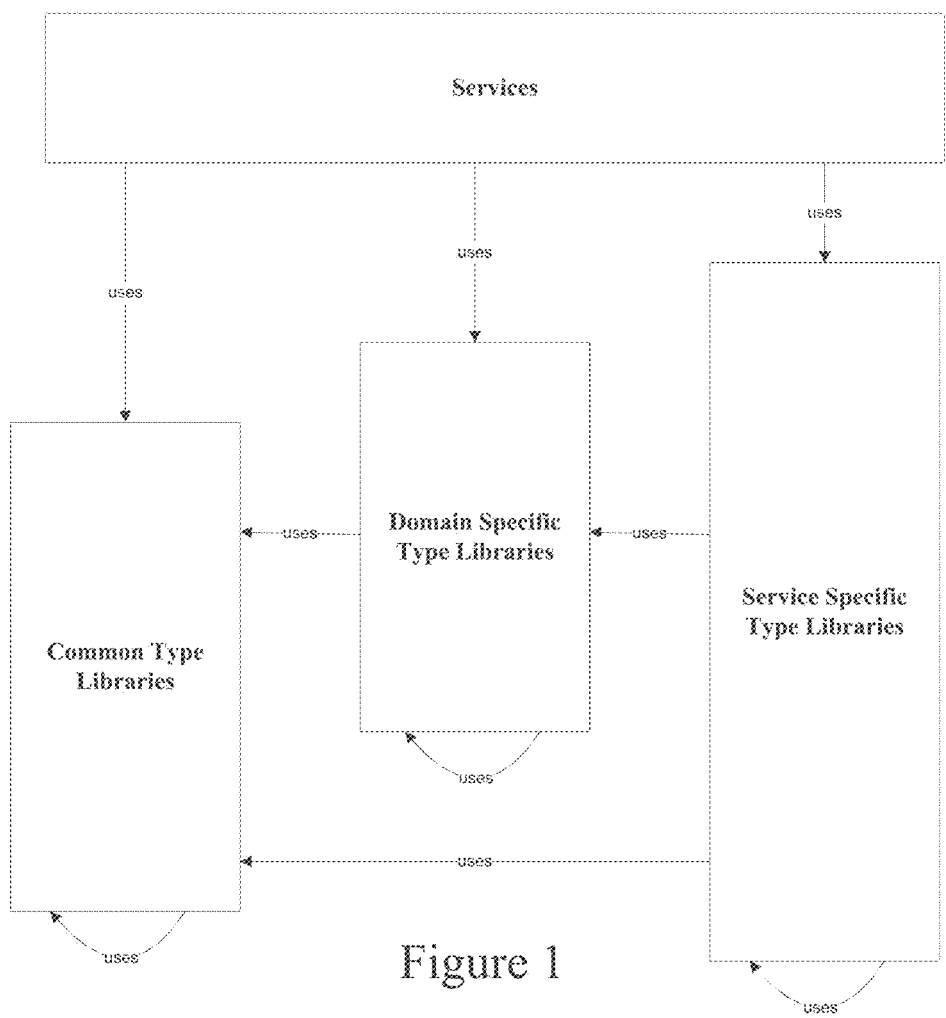
FIG. 1 illustrates an example embodiment of referencing across type libraries.

In the following description, for purposes of explanation, numerous specific details are set forth in order to provide a thorough understanding of some example embodiments. It will be evident, however, to one of ordinary skill in the art that the present invention may be practiced without these specific details.

As described further below, according to various example embodiments of the disclosed subject matter described and claimed herein, there is provided a computer-implemented system and method for creating, managing, and reusing schema type definitions in SOA services, grouped in the form of libraries. Various embodiments are described below in connection with the figures provided herein. In particular, as depicted in the various figures included herewith, the type library manager of the disclosed system and method provides a methodology and mechanism for creating and managing XML schema-based data types and their translation to corresponding Java code under the standard Java API for XML Binding (JAXB) v2 approach. Type libraries are primarily used in the context of SOA services, although the mechanism is not limited to services.

Systems exist for helping to create and manage services and service consumers typically using an IDE plug-in and the underlying command line tools. The SOA Tools Platform (STP) project from the Eclipse Foundation is a conventional design to build frameworks and exemplary extensible tools that enable the design, configuration, assembly, and deployment of SOA services. The STP provides an Eclipse plug-in (a software component) to create and edit Web Service Description Language (WSDL) used to describe SOA services. The XML type library systems and methods described herein add tooling support and processes for creating and managing the underlying data types used in the WSDL. Without such a process and tooling, the whole re-use of services and their data types becomes unwieldy. In order to be consistent in an implementation of service interfaces and to support efficient and effective communication between services, it is beneficial to re-use data types where applicable. Data type re-use also helps in preventing extra translation and conversion layers.

The various embodiments described herein provide a comprehensive solution for creating and managing the underlying data types, through a type library feature and a type library manager. As described herein, a type library manager collects together a series of individual XML schema (XSD) types, each expressed as an XSD fragment. Each XML schema type is managed individually, and can be created, edited, and deleted against the type library with which the XML schema type is associated. Each XML schema type has an associated Java artifact (e.g., the generated JavaBean produced by JAXB's schema compiler). JavaBeans are reusable software components for Java that can be manipulated visually in a builder tool. Practically, JavaBeans are classes written in the Java programming language conforming to a particular convention. JavaBeans are used to encapsulate many objects into a single object (the bean), so that they can be passed around as a single bean object instead of as multiple individual objects. All XML schema types (and implicitly the associated Java artifacts) can be registered in a type library bundle (denoted, a jar) through a metadata file called a Type Information File. In a particular embodiment, this file is named the TypeInformation.xml file. The user references a type library for use within a WSDL document, through the tooling provided for a particular SOA build platform. In the process of referencing a type library, individual XML schema types can be selected for use. The selected types can be registered for usage through a Type Dependencies File. In a particular embodiment, this file is named the TypeDependencies.xml file. This Type Dependencies File helps control the XSD-to-Java build process, as described in more detail below.

The XML Schema standard (XSD) provides two related type document inclusion mechanisms—import and include, which allow modular definition of collections of schema types for inclusion in WSDLs. However, in practice, the resolution of the include paths is very problematic across various implementations of XSD processors and various software environments. Also, the import/include mechanisms usually bundle many types, only some of which might be used in a particular web service described by a WSDL. As provided by the various embodiments described herein, the inlining of types in a WSDL is easier to manage and more targeted, because a precise set of types from a collection can be included.

Sun's reference implementation of JAXB v2 (JSR 222standard) provides the basic methodology and framework for detailed mapping of XML schema data types to corresponding JavaBean objects. The reference implementation also provides limited support for incremental rebuilding of Java generated types, through the JAXB episode file. The various embodiments described herein go well beyond this. In particular, as provided by the various embodiments, there is a file (TypeInformation.xml) describing types contained in a type library. A second type of file (TypeDependencies.xml) defines the dependencies of types included in the current library to the types defined in other libraries. The Type Dependencies File goes beyond the functions of a JAXB episode file, operating at a higher level to manage 1) the overall construction of composite XSD source; 2) the specific selection to generate/not generate JAXB-derived Java files as appropriate; and 3) type dependencies across type libraries.

The various embodiments described herein provide the tooling to create, edit, and reference type library types. Many environments, such as Microsoft's .NET and Eclipse WTP, do provide source level management of XML schema, the import and include organization of XML schema, and the building of XSD into associated code artifacts. However, building of individual XSD documents into code artifacts via JAXB or .NET typically needs to be incremental, on a per-XSD document basis. Typically, existing tools express schema dependencies only at the composite XSD document level. In contrast, the various embodiments described herein provide a solution to manage types at their individual granularity while still maintaining the containment relationship between type and type library. This helps to manage reuse of types across services more effectively. Finally, the various embodiments described herein provide a solution to fold referenced types into a WSDL as inlined types. Accordingly, the various embodiments include a build process that can limit itself to build only the uniquely new types in a WSDL, referencing any other types via their originally compiled artifacts as resident in the corresponding referenced type library. One of the unique aspects of the type library of a particular embodiment is its ability to create software project folders and library packaging mechanisms for each well-defined module of reusable XML schema types that is used in a WSDL. Another embodiment aspect is a set of graphical tooling to help manage the definition and referencing of XML schema types in WSDLs and Type Libraries.

The various embodiments described herein represent the type definition using an XML schema that is stored in its own schema file. For example, if we have a type called "Item", then that definition is stored in a file called Item.xsd. When defining the data type (e.g., Item), it is important to adhere to pre-defined rules, conventions, and guidelines. The tooling described herein can help enforce some of those guidelines. Examples of such enforcement by tools include constraints on the name of the types (e.g., starting the name with lowercase), criteria for enum (enumeration) definition (e.g., limits on the number of possible values), adding the appinfo (application information) element under an annotation tag etc. to represent comments. Enforcement of other rules, conventions, and guidelines can be similarly implemented by the embodiments described herein.

Sometimes it may be necessary to create derived types from existing base types. For example, someone may want to create a BiddingItem type, which is derived from (or extends from) Item type. By the rules established above, BiddingItem will be in its own schema file, but will import Item.xsd in its file and use the schema extension mechanism to define the additional elements for the BiddingItem type. The same thing can apply for restrictions as well. At the time of importing, the version of the schema being imported will also need to be specified. The import of this base type is done using a special Uniform Resource Identifier (URI) scheme of the form:

```
<xs:import
    schemaLocation="typelib://CommonTypeLibrary/ItemType.xsd">
```

Where the URI scheme name "typelib" resolves to the corresponding type library from where the referenced type is imported.

When generating Java types from the XSD types, these types are generated in a Java package associated with a namespace of the XSD types. For example in a particular embodiment, we can use the single namespace http://www.ebay.com/marketplaces/services for all the types defined in a type library, for simplicity. In other embodiments, we may also use multiple namespaces in the same type library. The design described herein does not preclude this option. It is not reasonable that all the types defined in this namespace would need to map to the same Java package when we generate Java types. For example, some types could be in a common package like:

com.ebay.marketplaces.services.types.common while some other types could be in a domain specific package like:

com.ebay.marketplaces.services.types.search

In general, the various embodiments described herein support a capability to generate types, within a single namespace, into a specific Java package.

Given that type definitions may need to change over time, there are two forms of type definition changes provided in a particular embodiment. These forms of changes are; changes that are compatible with the old definition, and changes that are not compatible with the old definition. Examples of compatible changes include adding new optional elements in place of a placeholder (wildcard) "xs:Any" element. Examples of non-compatible changes include adding new elements or changing the semantics of existing elements. Making any non-compatible changes will break existing services and any consumers of that type. As a convention, non-compatible changes should not be done to an existing type. If non-compatible changes must be done, then, a new type (either as an extension or a brand new type) should be created. However, compatible changes can be done to an existing type. Every time a change is made to an existing type, the version of the type needs to be updated. The version of the type should be indicated using the version attribute of the schema. For example:

```
<xs:schema xmlns:xs=http://www.w3.org/2001/XMLSchema
    elementFormDefault="qualified" attributeFormDefault="unqualified"
    version="1.0">
```

As part of SOA tooling, in a particular embodiment, it is important to enable service developers to pick and choose the types they would like to use in their service WSDL. Sometimes, developers may create new types either deriving from existing types or creating brand new types. Either way, it is important to provide a mechanism for easily managing these types.

In a particular embodiment, a TypeLibrary concept is introduced for the purposes of managing groups of these types together. A TypeLibrary is a collection of types that are bundled together for easier management purposes and form a logical group.

As mentioned above, a type library can potentially contain types that belong to different namespaces. Likewise, a type library may also contain multiple Java packages. Typically, types from multiple namespaces don't go into the same Java package, although types from the same namespace can go to multiple Java packages.

Types can be at different levels. Some types may be common to all services in an organization. Other types may be common to all services only within a specific domain/group. Other types may be only specific to a given service or application. For this example, a particular embodiment may define three hierarchical layers of type libraries: Common, Domain specific, and Service or Application Specific. Potentially, there could be multiple libraries at each level.

In a particular embodiment, a Type library project is a special project and a type library build artifact is represented using a jar file. This jar file has all the XML schema (XSD) files that correspond to each type in the type library and their corresponding generated Java source files, and compiled class files and possibly episode files.

The type library itself is not versioned, but the individual types are versioned. However, for the purposes of debugging and tracking, the jar file for the library is decorated with a build number or such in the manifest file.

When building a service, our code generation (codegen) tool produces the Java interface for the corresponding port types in the WSDL. In addition, by default, the Java classes that correspond to the schema types are also generated. Now that these Java classes come from a type library that was pre-compiled together, we don't want to again generate the Java classes that correspond to the types in the WSDL during service build. Our code generation tool consults the type dependency file to identify types that don't need to be created and skip them.

To control the explosion of dependencies and manageability aspects, it is important to group type libraries into hierarchical layers and to enforce pre-defined rules and conventions when it comes to referencing types from one library to types in another library. FIG. 1 illustrates the referencing rules in a particular embodiment.

In the embodiments set forth above, we described how to natively represent types, how to group them, how they are mapped to Java classes, how they are managed. Next, we describe how these types are represented in the WSDL, which is what we publish to the consumers. There are several dimensions to consider as addressed below.

- Conventional systems show all types. The various embodiments described herein can show only the needed types for that WSDL.
- Conventional systems provide only consolidated schema file inclusion. The various embodiments described herein can provide individual type schema file inclusion.
- Conventional systems provide only standard import functionality. The various embodiments described herein can provide inline type inclusion.
- Conventional systems provide only Uniform Resource Locator (URL) links. The various embodiments described herein can provide a Uniform Resource Identifier (URI) scheme to resolve type referencing across type libraries.

Our type libraries may have many different types, but not every type is used by a given service. When we generate the WSDL for a service, it is beneficial to specifically include only the types used by the given service. In various embodiments, the dependency management functionality maintains a list of types used by a given service, as discussed above. This effectively means that the service project has a "types-dependency" file, which contains all the types used by the given service, including their versions. In conventional systems, dependency information is used only for dependency analysis or impact analysis or second time WSDL generation. However, in the various embodiments described herein, as the user creates the WSDL and specifies the types used in operations, those specific types are automatically inlined into the WSDL document. Thus, the various embodiments include only those needed types when creating the WSDL (and any subsequent regenerations for whatever reason), instead of including all the types from the libraries. In this manner, unnecessary types don't waste system resources. Because each type is stored in its own schema file as described above, a particular embodiment can create a temporary new schema file that contains all the required types for the given service, if any type import/include is used. Then, the temporary new schema file can be inlined as a single schema definition in the WSDL. This aggregation of needed types into a WSDL simplifies the WSDL. This WSDL file is associated with the specific service project and is not retained as part of the type library. Even the service specific types can be implemented as types in Type Libraries, which is not part of the service project. In this way, types always come from type libraries no matter what their scope is, and we can assemble just the types we need for this service from various type libraries.

The various embodiments provide several ways to incorporate types in a WSDL being created. For example, when it comes to specifying the types needed in the PortType definition inside the WSDL, there are three different choices:
  Include the types using an "xsd:import" statement
    (e.g., xsd=http://www.w3.org/2001/XMLSchema)
  Include the types using an "xsd:include" statement
  Include the types directly in-line The import statement is used to import types from a different namespace than the target namespace defined in the WSDL.

The include statement is used to import types from the same target namespace. This is relevant, as our types can belong to a single namespace. An example of the include statement in a particular embodiment is set forth below:
  <xs:include-schemaLocation=http://www.ebay.com/types/Included.xsd>

The schemaLocation, as in the example above, can be either a relative path or a URL like above. Either way, this is a separate file and the WSDL parser can download this file separately. This file can be separately managed as well.

The third option is to directly include the types in-line in the WSDL document under the <types> section. This option provides the least amount of management work and at the same time creates convenience for the WSDL consumer. For this reason, we can aggregate all the types needed and include them in-line under the <types> section.

Now that the types are incorporated for the WSDL's we create as described above, the various embodiments can also notify the corresponding WSDL's when the type definition changes in the type library. Because the type library from which the types are used is kept as a dependency on the service project that has the WSDL, a relationship between the types and the WSDL can be maintained. The service project also has the reverse connection, e.g., a list of types used in the service. These type dependency information can be used to skip the generation of types already created in their type libraries.

As described above, a computer-implemented system and method for creating, managing, and reusing schema type definitions in SOA services, grouped in the form of libraries is disclosed. In a particular embodiment, additional details of the system and method are presented below.

Type Library

In a particular embodiment, a type library is a library that can contain Java types. These Java types are automatically generated from user defined XML schema files. Additionally, type libraries can be implemented in accordance with the following conventions:

a. A type library can contain multiple user defined XML schema files;

b. Each XML schema file can contain only one type definition;

c. All the XML schemas in a library must share the same namespace; and d. The library can depend on other type libraries if needed.

In an embodiment using the standard Eclipse system, a type library project is an Eclipse project in which XML schema files (.xsd files) are defined. Binary code generated from this project is a Java jar file containing: 1) the XML schema files, 2) the Java type source code generated from the XML schema files, and 3) the binary Java .class files created by compiling Java type code generated from the XML schema files. A type library project has Type Library functionality to handle the creation of Java type files from XML schema files. A type library jar can be referenced by the SOA service interface projects when the service interface project's WSDL includes types from type libraries.

Structure of a Type Library

Figure 2:
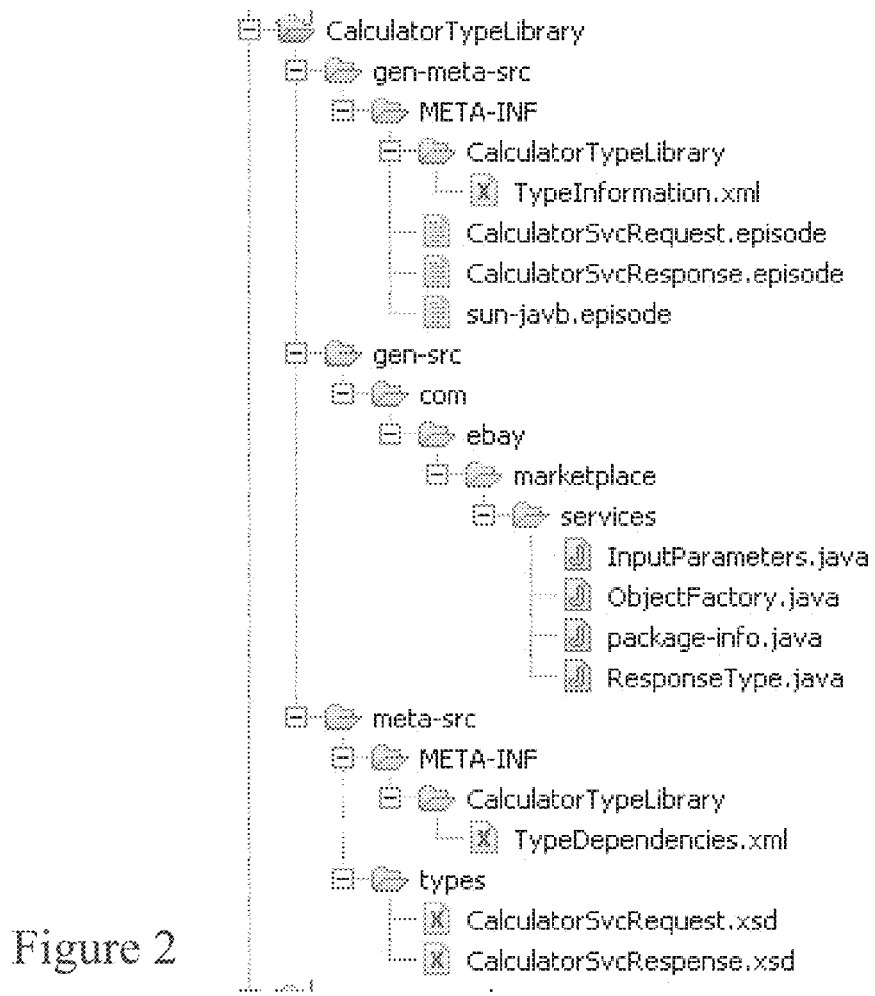
FIG. 2 illustrates an example embodiment of the structure of an example type library.

Referring to FIG. 2, an embodiment of the structure of an example type library is illustrated. The sample type library contains two types: the CalculatorSvcRequest.xsd and CalculatorSvcResponse.xsd. The associated files in the example are shown in FIG. 2. In FIG. 2, gen-meta-src is the root directory hosting generated meta data files; meta-src is the root directory hosting non-generated meta data files, such as the wsdl file for the service; gen-src is the root directory hosting all the generated java source files.

Content of a Type Library

In a particular embodiment, a type library can contain the following kinds of artifacts:

XSD files
Java Files
Class Files
Individual Episode files
sun-jaxb.episode file
TypeInformation.xml
TypeDependencies.xml XSD Files:

These files are the xml schema definition files. These files contain the xml types and each type can be defined in an individual file. For example, the ItemType.xsd can be defined in ItemType.xsd file.

Java Files:

When the XJC (XSD to Java Converter) is compiled against the XSD's, the corresponding Java files get generated. The XJC tool can be used to convert XSD files to Java class representations.

Class Files:

These files are the Java class files for the corresponding generated Java files.

Individual Episode Creation:

For each of the type in the type library, an individual episode file is generated. For example, the ItemType.xsd will have ItemType.epsiode file generated. There will be "n" number of episode files for "n" number of XSD files.

Sun-jaxb.epsiode:

This is the Sun standard of naming the episode file when the episode file exists in a jar file. This episode file is a union of all the individual episode files of a Type Library.

TypeInformation.xml:

This file contains information about the type library (its version and its category) and the types defined in the type library. For each type, the following elements are retained: the xml type name, Java type name, and the version of the type. When a new type library project is created or modified, the TypeInformation.xml file is generated. The TypeInformation.xml file can contain the following attributes.

XML type name (xml-type-name)

Java Type Name (Java-type-name)

Version (version) (Library version and the individual types version)

Layer (layer in which this type is created) (Category)

The namespace of the library, a type library and its types should all be under one common namespace.

For example, the XML format for the TypeLibrary ItemTypeLibrary, the TypeInformation.xml would look like the example shown below.

Versions for types follow the same convention as the version for the library, which has a major version, a minor version, and a maintenance version. The root element of the XML contains the information pertaining to the namespace of the Library (libraryNamespace), the name of the library (libraryName) and the version of the library. An example is shown below.

```
<?xml version="1.0" encoding="UTF-8" standalone="yes"?>
<typeLibraryType
    xmlns:ns2=http://www.ebay.com/soaframework/common/config
    libraryNamespace=http://www.ebay.com/soaframework/examples/
    config version="1.0.0"
    libraryName="ItemTypeLibrary">
    <ns2:type version="1.0.0" Java-type
    name="com.ebay.soaframework.examples.config.Item" xml-type-
        name="Item"/>
</typeLibraryType>
```

TypeDependencies.xml:

This file contains information related to types, their versions and their hosting type library to which types defined in this type library refer. When a service/type library uses some of the types in a type library, the references to the types used by the service/type library is stored in the TypeDependencies.xml file. The attributes of the file can contain the following elements:

Type Library Name

Type Name

Version

In the below example, ShippingItemLibrary is the name of the type library that contains this TypeDependencies.xml file. In the example below, this information is redundant as the name of the type library project which contains it is the same as the value of the library name. But this information is there to make sure this XML code is self contained and doesn't have to be necessarily inside the project to identify the library name.

The Type name (ShippingItem) is the type inside the ShippingItemLibrary referring to other types inside this library (e.g., ShippingCost, ShippingRoute, etc.) and external library (ElectronicItem, Item) also. The example is shown below.

```xml
<?xml version="1.0" encoding="UTF-8"?>
  <typeLibraryDependencyType libraryName="ShippingItemLibrary"
  version="1.0.0"
  xmlns="http://www.ebay.com/soaframework/common/config">
    <type name="ShippingItem" version="1.0.0">
      <referredTypeLibrary name="ShippingItemLibrary"
      version="1.0.0">
        <referredType name="ShippingCost" version="1.0.0"/>
        <referredType name="ShippingRoute" version="1.0.0"/>
      </referredTypeLibrary>
      <referredTypeLibrary name="ItemTypeLibrary" version="1.0.0">
        <referredType name="Item" version="1.0.0"/>
        <referredType name="ElectronicItem" version="1.0.0"/>
    </type>
    ...
  </typeLibraryDependencyType>
```

The TypeDependencies.xml file is included in the jar files generated for the type libraries and can be accessible by the build system. During the build time, the service TypeDependencies.xml will be compared with the TypeInformation.xml of the referred type library. The version check is done at the build time. The current-version element is checked against the version element in TypeInformation.xml in the type library. If there is a version mismatch the user can choose to proceed with the current version using or can upgrade the version to the latest. The old version should be compatible with the latest version.

Type Library Creation

In a particular embodiment, we provide a TypeLibrary option that creates a new TypeLibrary project. This is a special type of project with all the characteristics described earlier. A dialogue can request user input of the following data items associated with the new TypeLibrary project:

Name of the library (and location, etc.)

Type library layer (common, domain specific, or service specific)

This TypeLibrary project can retain checked in files of individual XML schema (XSD) type files and a built artifact of a jar file. In this manner, the Type Library can retain the generated Java source files for the types and the corresponding class files. A "Build project" for this type of project can run JAXB XJC on all the schema files and produce the Java files, compile them and archive them together. Given the configuration of the Type Library as provided by the various embodiments described herein, incremental compilation can be supported. For example, if a new type is being added to a Type Library, the build project can be configured to only compile that new type and to archive only the newly compiled type into the existing jar file. This is an optimization. The "build project" may also need to produce the JAXB episode files and keep them in the jar file. The plug-in provides right-click options on the TypeLibrary type project to build, search (name based or xpath based), add-new-type, edit existing-type and delete-type options.

Figure 3:
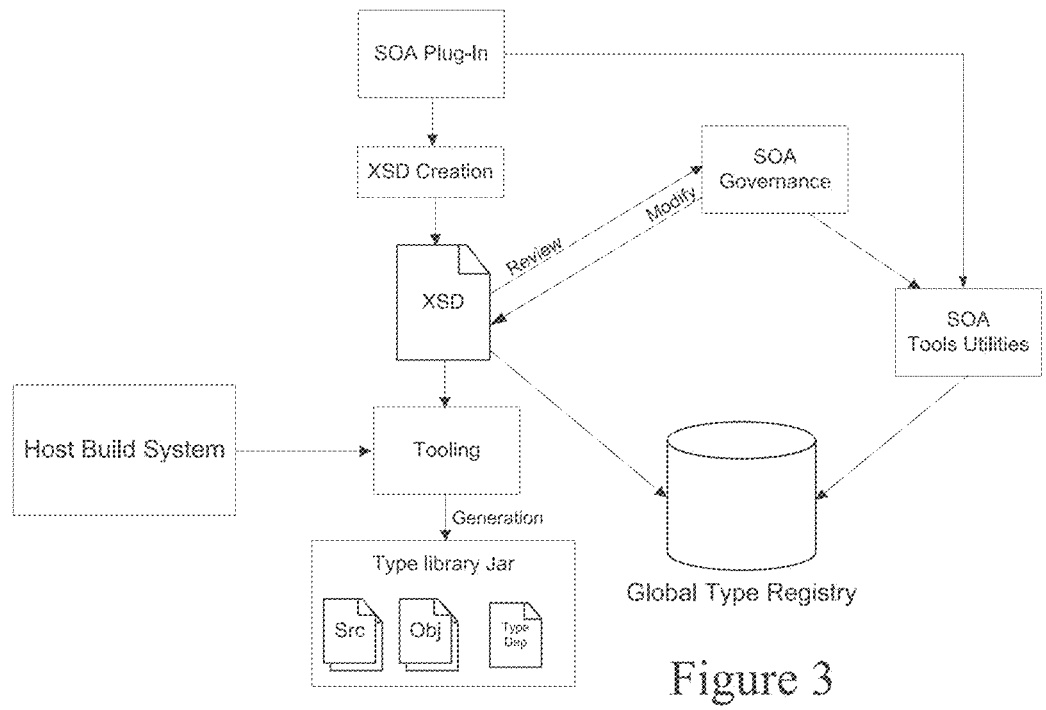
FIG. 3 illustrates an example embodiment of a system and method for creating a Type Library.

Referring to FIG. 3, an embodiment of a system and method for creating a Type Library in an example embodiment is illustrated. As shown in FIG. 3, a host build system is provided to process XML schema (XSD) type files to produce corresponding Java output files. In a particular embodiment, a SOA Plug-in has a wizard-like option that creates a new TypeLibrary project with the structure of the type library described below. The wizard provides an interface to prompt a user for entry of the following information:

Name of the library (and location etc.)

Type Library version

Layer (common, domain specific, or service specific)

The SOA Plug-in also has a wizard-like interface to create a new type, given the name of the type, the name of the type library it belongs, the kind of schema type to create (SimpleType, ComplexType, etc). SOA Plug-in provides way to browse the schema types already defined to make it easy for user to pick a defined type. The TypeDependencies.xml file is updated whenever a type in the type library referenced or de-referenced from another type. The qualified name of a type should be unique across the type libraries. The SOA Tools will provide a utility which checks for the uniqueness of the type name across the type libraries.

When building a type library project, either under IDE or using command line build, the SOA Plug-in or the host build system can in turn communicate with the XSD Creation component and the Tooling component (which will be compiling all the XML schema (XSD) type files through the XJC task) and the corresponding files, listed below, will be packaged into the newly created type library jar.

XSD's

Java Class Files

Java Source Files

Individual Episode files

Sun-jaxb.episode file

TypeInformation.xml and

TypeDependencies.xml

In a particular embodiment, the type library project is only allowed to have checked in files of individual XML schema (XSD) type files, and a built artifact of a jar file, which keeps the generated Java source files for the types, the corresponding class files, xml schemas, and the episode files.

Incremental compilation is supported in a particular embodiment. For example, if a type is being added/modified to an existing type library, a build project of the type library should only compile that type and archive that into the existing jar file. This is an optimization. The "build project" will also need to produce the JAXB episode files and keep them in the jar file.

Type Creation in a Type Library

Figure 4:
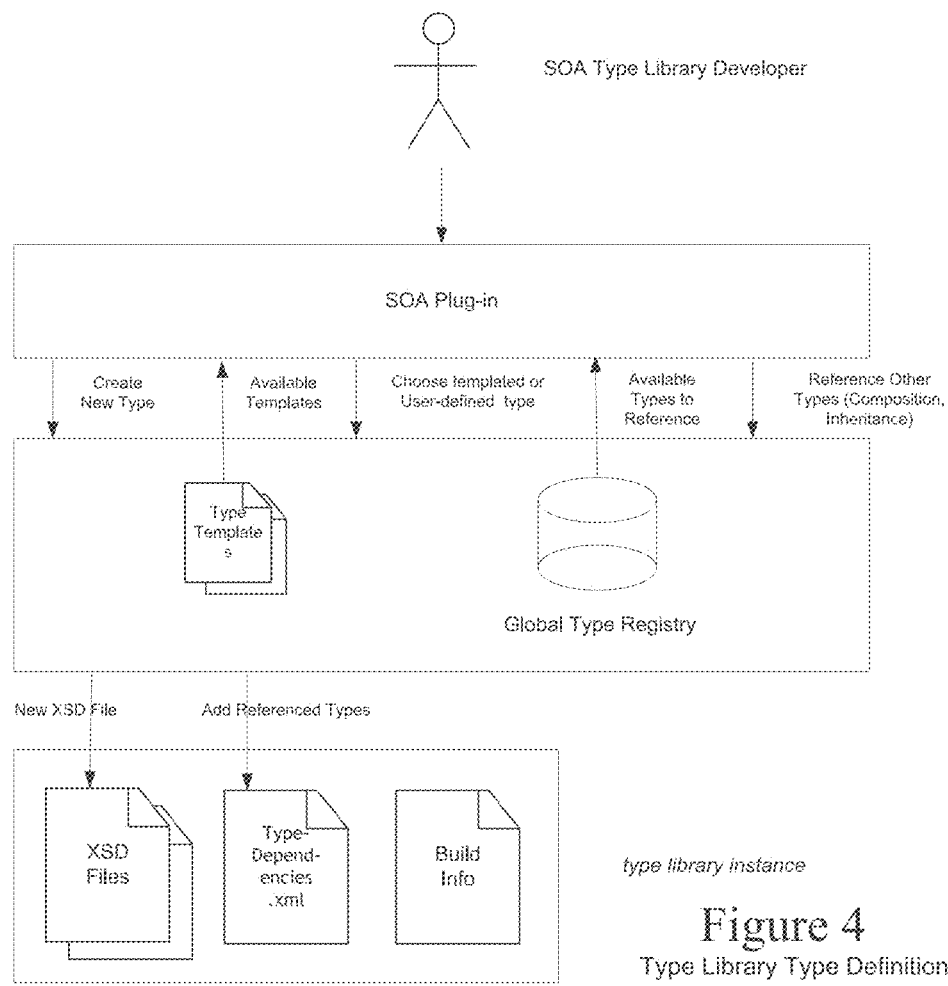
FIG. 4 illustrates an example embodiment of how an SOA Type Library Developer can use a Type Library to create new types.

Referring to FIG. 4, an SOA Type Library Developer can use a Type Library as described above to create new types and to derive new types from types already existing in the Type Library. In a particular embodiment, we also provide a Type option that creates a new Type. A dialogue can request user input of the following data items associated with the new Type:

The name of the type (name and namespace, with namespace default filled in)

version

Name of the library to which the new Type belongs

Type category (enum, list, map, complex type etc.); The dialogue can further offer the user an appropriate template based on the selection. This should apply the guidelines as discussed earlier.

If the new Type extends from an existing type, allow the user to select the existing type Right click options for a Type can be provided which includes "build", "edit" and "delete", "show dependencies" and "validate" the new Type. The "delete" and "edit" operations can check for any existing dependencies and warn the user of such dependencies. When extending types, the Type Creation functionality can also enforce the layering rules described above. The "validate" option is to validate if the type follows the predefined guidelines and rules. We provide default validators as well as, allowing specification of custom validators (through preferences).

Integration with the Build System

In a particular embodiment, the management of types happens through the plug-in's interface with underlying repository. The SOA plug-in can submit the "new Type" request to the repository, provide browsing capability for types in the repository through its type explorer and allow searching the types and managing dependencies through the repository.

When creating the WSDL, SOA plug-in's WSDL editor enhancements allow creating new operations with request and response types. The user can select the request and response types from existing types from any type library in the repository or create new types on the fly. Essentially, the type management plug-in can be integrated with the WSDL creation process. Additionally, as discussed earlier, the service project can maintain the dependencies on the types used. This can be maintained in the repository.

In a particular embodiment, the following user process can be used to create a new type: A User can select an option to create a new type. This User selection can result in a dialogue that prompts the User for entry of:

The name of the type (name and namespace, with namespace default filled in);
Version;
Name of the type library to which the new type will belong;
Type category (enum, simpleType, complexType etc.);
If the new type extends from an existing type, allow the User to select the existing type.

In a particular embodiment, all the existing types in a type library can be browsed and the user can choose to extend the new type from the existing type. When a type is added/deleted to/from the type library, or when a type is changed, the TypeDependencies.xml file is maintained by the SOA plug-in to ensure that the TypeDependencies.xml file is consistent with the current types defined in the library.

In a particular embodiment, all the existing types in all type libraries can be accessed collectively by tooling, via a "global type registry". The type registry exists as a conceptual entity, comprising the information in all type libraries known to the build system; and mechanisms in our tooling also serve to read summary information from all these libraries, and build up an in-memory store of this information for ready use by tooling (e.g., the Eclipse plugin). The initialization of the type registry as described herein is included as part of the Type Library and Type Creation process described in more detail below.

Figure 5:
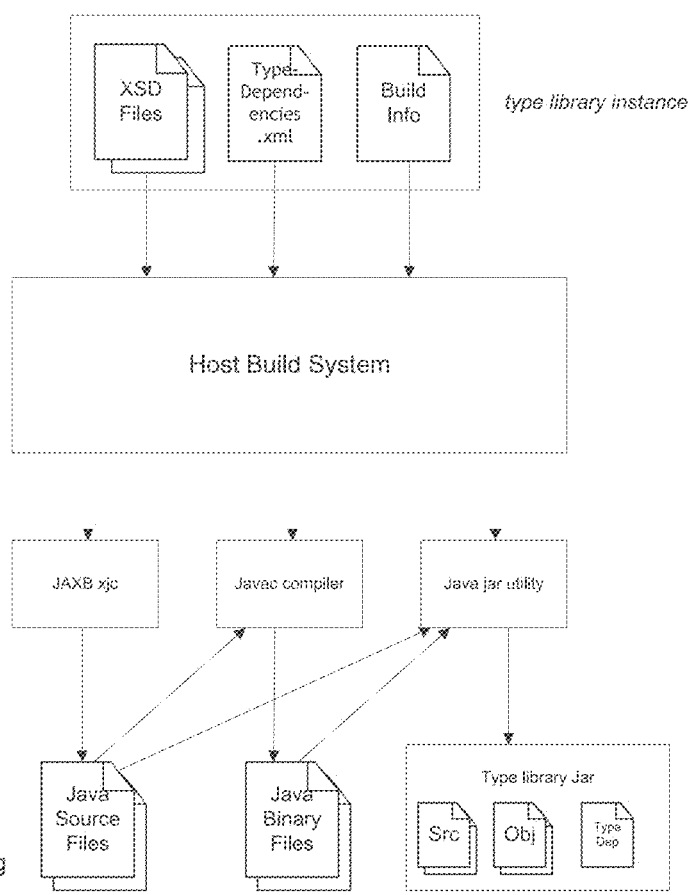
FIG. 5 illustrates an example embodiment of a system and method for building a Type Library.

Referring to FIG. 5, an embodiment of a system and method for building a Type Library in an example embodiment is illustrated. As shown in FIG. 5, building a type library can be performed as a multi-step process. A series of operations for building a type library in a particular embodiment are described below:

1. Use JAXB's XML Java Compiler (XJC) to generate Java code from XML schema (XSD) files. Also generated are the episode files for each of the XML schema (XSD) files;
2. Assemble the sun-jaxb.episode file and TypeInformation.xml file;
3. Build the generated Java files;
4. Create a type library jar file containing the XML schema (XSD) files, Java, Java binary, sun-jaxb.episode, TypeInformation.xml, and TypeDependencies.xml files.

Creation and Management of Services that Refer to Types in Type Libraries.

Figure 6:
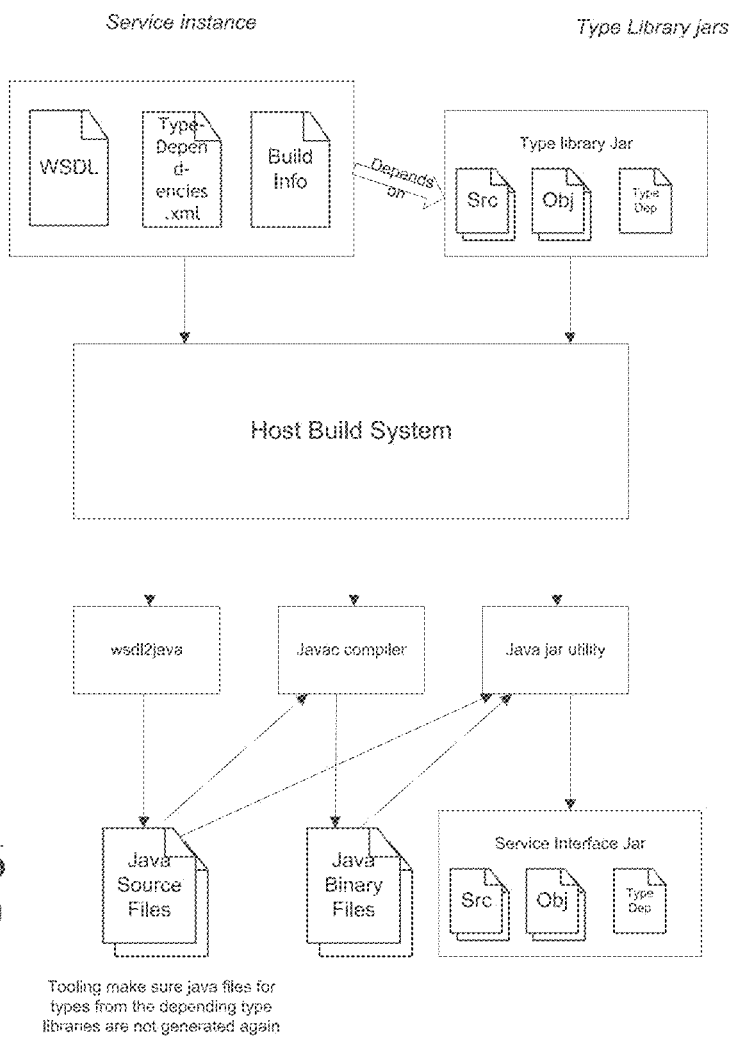
FIGS. 6 and 7 illustrate example embodiments of a system and method for building a Service.
Figure 7:
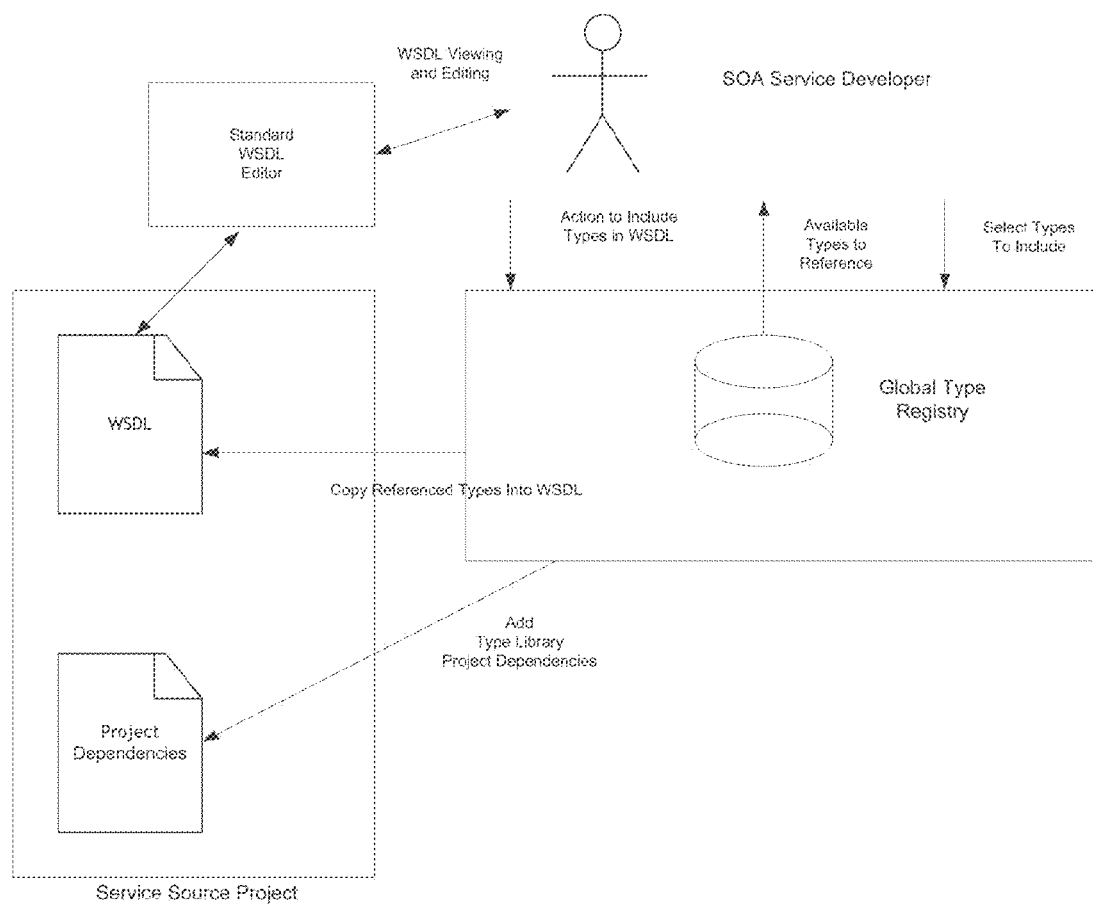

Referring to FIGS. 6 and 7, an embodiment of a system and method for building a service in an example embodiment is illustrated. As shown in FIGS. 6 and 7, a service developer can pick and choose the types they would like to use in their service interface. A service instance can use any of the types provided in one or more type libraries created in the manner described above. Then, the host build system can compile the selected types into Java files stored in a service interface jar.

While creating a service, the SOA plug-in can provide the user with an option to add dependencies. In a particular embodiment, there are two types of dependencies (e.g., Libraries and Projects). The user can be prompted to select the type library and/or project. The user will be presented with all the type libraries in the central repository in addition to the type library projects in the workspace.

In a particular embodiment of a system and method for building a service, a user can perform add or edit service operations as described below.

Figure 8:
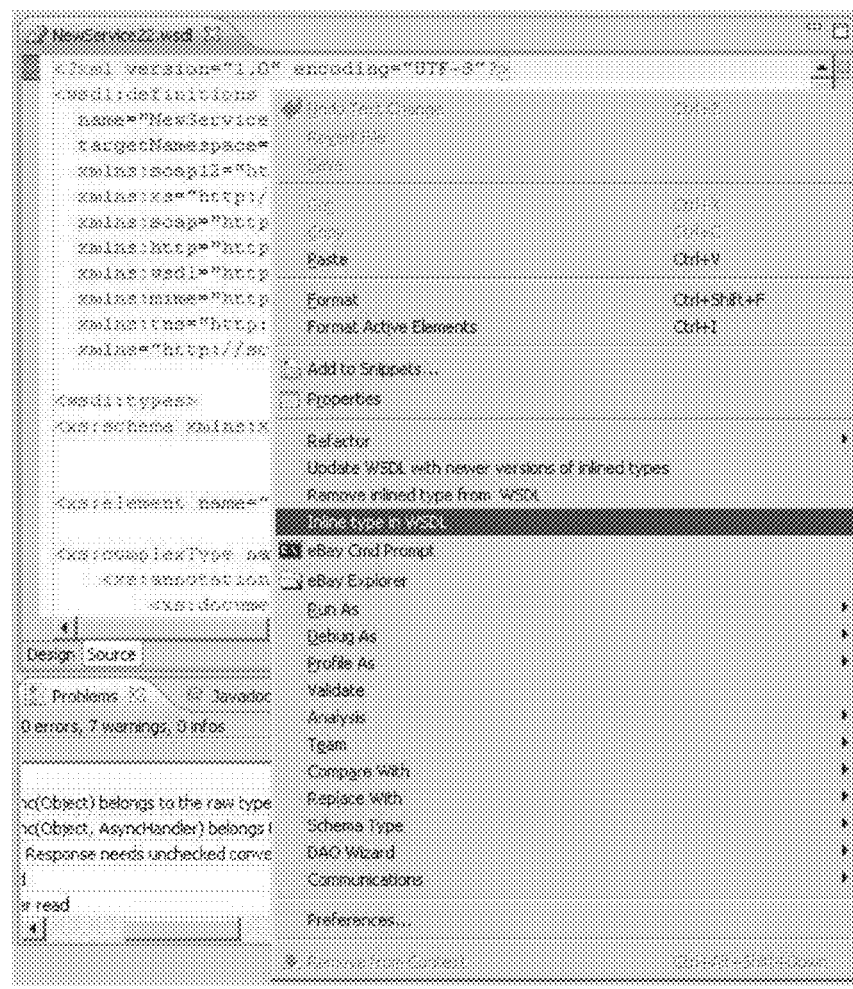
FIGS. 8-12 illustrate example embodiments of a user interface for implementing the system and method described herein.
Figure 9:
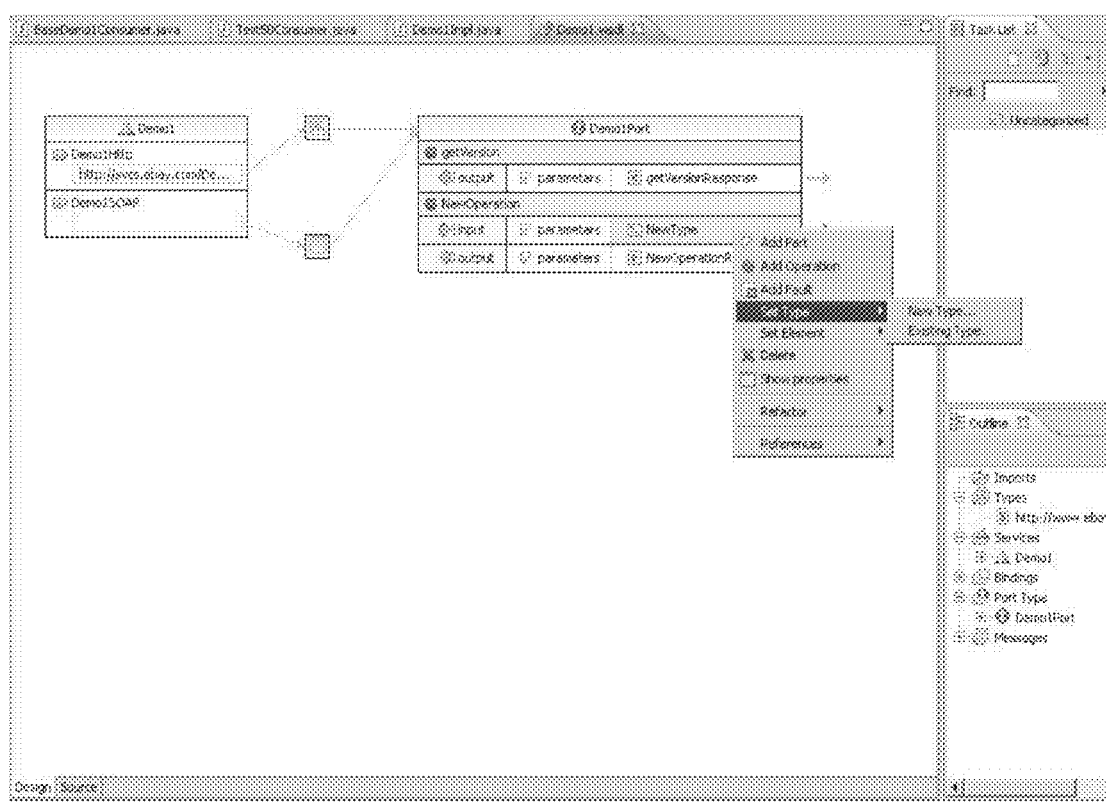
Figure 10:
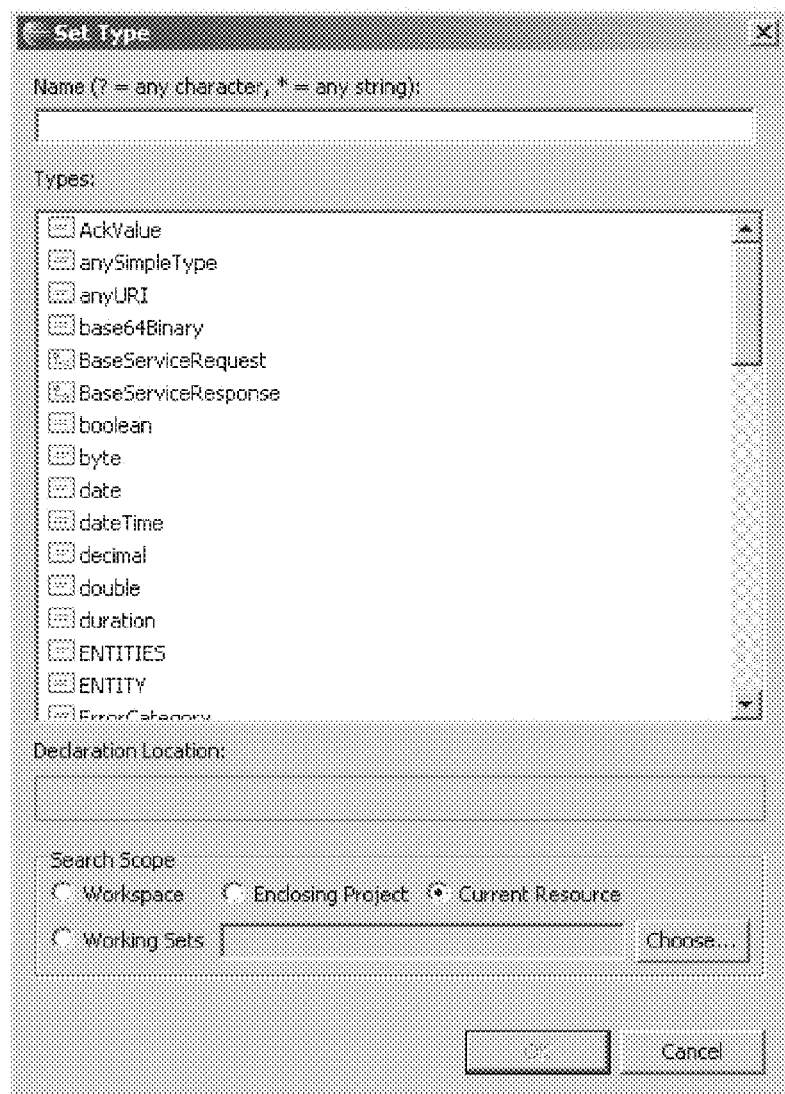

1) Referring to FIG. 8, the user can specify the insertion of types inline into a WSDL. The inlined types can be selected from a type library using the SOA plug-in as described above;

2) Referring to FIG. 9, while adding a new operation, the user can set the type using the WTP Editor's Set Type->Existing Type Context Menu;

3) Referring to FIG. 10, this will open up a dialog in which user can select the type. This wizard and its model can accommodate all the types from the central type repository.

After the add operation is performed as described above, the added type and its parent types will be inlined in the WSDL. The corresponding types will be fetched from the TypeInformation.xml file (which resides in the Type Library jar). After this, the Typerefernce.xml file will be consulted recursively to fetch all the required types. The WSDL will concatenate all the types needed inline in the WSDL. Finally, the typedependencies.xml file will be updated to reflect the dependency information associated with the newly added types. Note that the TypeDependencies.xml file is generated during the WSDL creation process. Any action (adding/deleting/updating) the type, the TypeDependencies.xml file is updated accordingly.

In a particular embodiment of a system and method for building a service, a user can delete a type from a service as described below.

Figure 11:
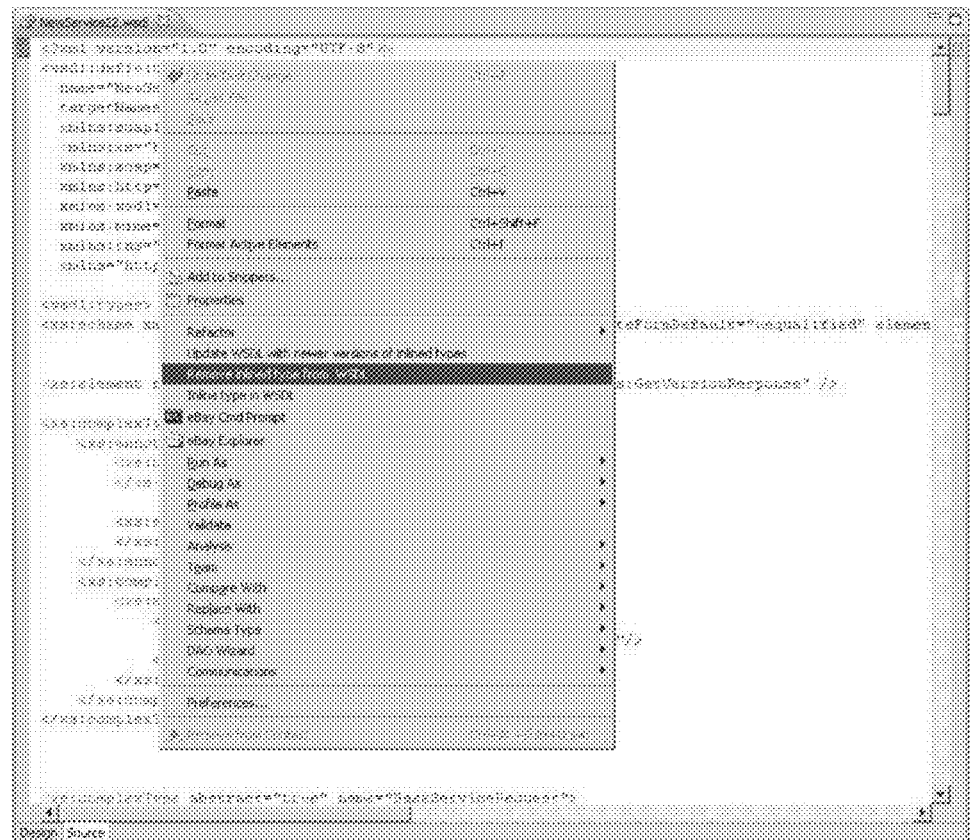
Figure 12:
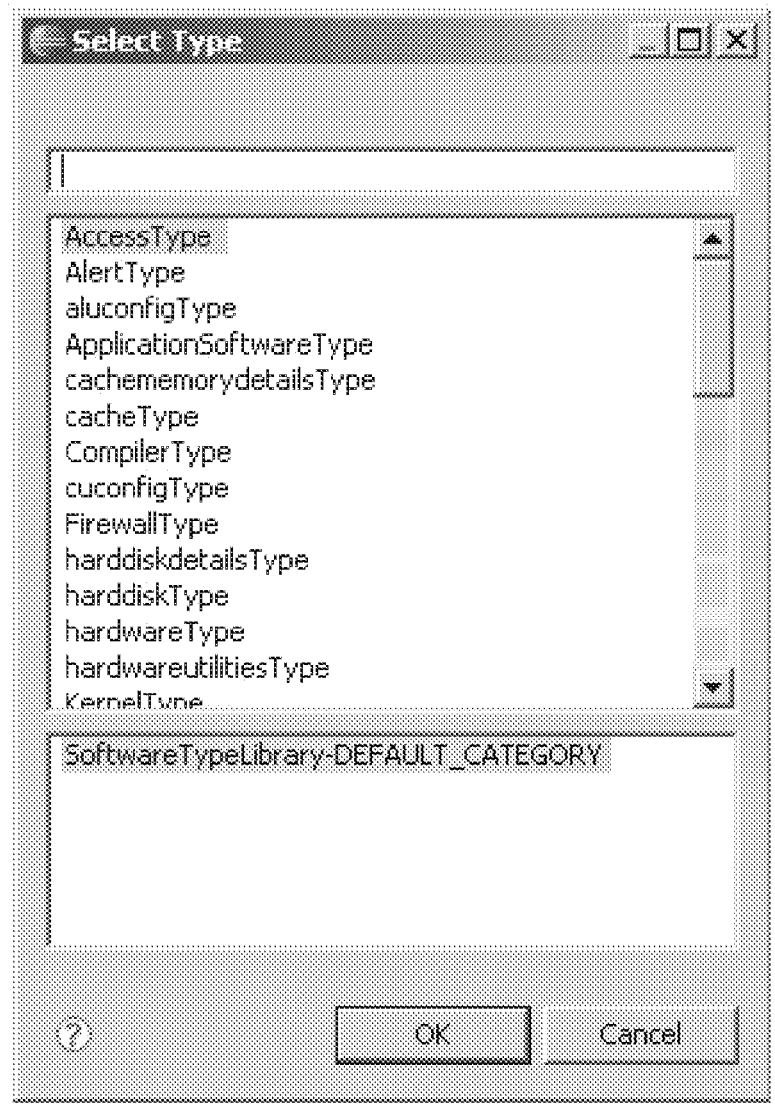
Figure 13:
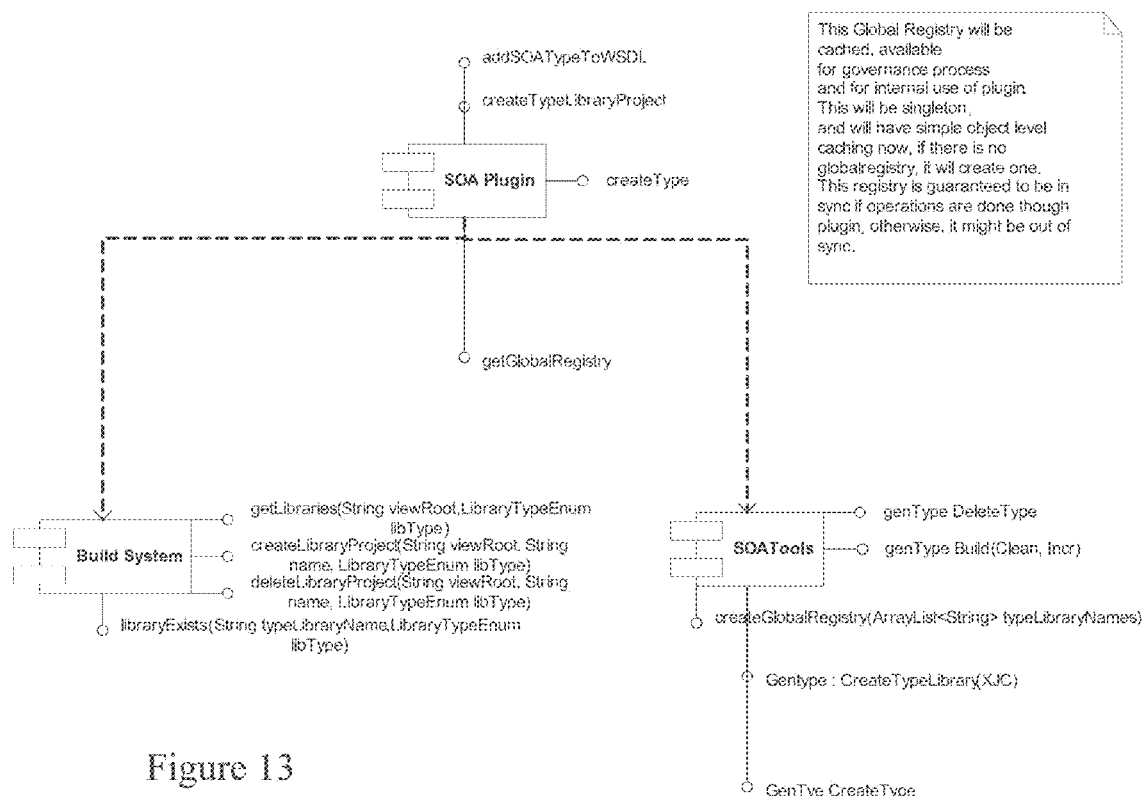
FIG. 13 illustrates an example of the SOA Tooling sub systems used in an example embodiment.

1) Referring to FIG. 11, the SOA plug-in can provide a new context menu and a wizard to inline/remove types from XSD and WSDL. SOA developers can use this wizard interface whenever they want to remove inlined type library types from WSDL;

2) Referring to FIG. 12, select the type to be deleted from the select types wizard and Click Ok.

After the delete operation is performed as described above, the specified type will be removed from the WSDL. Finally, the typedependencies.xml file will be updated to reflect the dependency information associated with the newly deleted types.

As described above, Types can be at different levels. Some types may be common to all services across a host. Other types may be common to all services only within a specific domain. Other types may be only specific to a given service or application. To accommodate this, we define three layers of type libraries: Common, Domain specific, and Service or Application Specific. Potentially, there could be multiple libraries at each level. When a type library is created for the first time, the type library is categorized into one of the above layers mentioned. An example of Type Library Layering is presented below:

```
<layers>
    <layer name = "common">
        <access>common</access>
    </layer>
    <layer name = "domain">
        <access>common</access>
        <access>domain</access>
    </layer>
    <layer name = "application">
        <access>common</access>
        <access>domain</access>
        <access>application</access>
    </layer>
</layers>
```

When one type library uses a type in another type library, the referencing rules are controlled by the above file. The above rules file will tell us the layer of the type library and the access to the other layers. In a particular embodiment, Service Layering can be controlled by rules defined in an xml file. An example is presented below:

```
<layers>
    <layer name = "common">
        <access>common</access>
    </layer>
    <layer name = "Intermediate">
        <access>common</access>
        <access>intermediate</access>
    </layer>
    <layer name = "Business">
        <access>common</access>
        <access>intermediate</access>
    </layer>
</layers>
```

The examples below illustrate the common use-case flows of how the type library of a particular embodiment is used. The examples list the steps for each use case and identify the needed sub-system interfaces.

A. Creating Type Library and Types
  1) Type Registry Initialization-Plug-in
    1.a) Create Type Explorer
  2) Create Type Library (User enters name, type library layer, version)
    2.a) Check Type Library exists.
    2.b) Check any Project exists with the same name
    2.c) Creates the skeleton project and Skeleton TypeInformation.xml.
  3) Create Type(User enters, Type Name, Version, Type Template(Categories available) and selects Type Library)
    3.a) Check type name exists
    3.b) Creates the XSD with the template and name provided and adds an entry to TypeInformation.xml-No compilation Required.
    3.c) Opens up the created XSD in an editor.
  4) Type Library Build(Incremental)
    4.a) Generates the corresponding Java files and episode files.
    4.b) Opens up the new XSD in an editor.
  5) Delete Type(User selects the type to be deleted)
    5.a) Check if this type can be deleted
      5.a.1) First Step would be to see if this type is being referred from another or this typelibrary or some service interfaces. If the type is referenced, want the user with a dialog
    5.b) Remove all entries from TypeDependencies.xml if it exists.
    5.c) Take it out from the TypeInformation.xml and delete all generated files and start regenerating everything.

B. Consuming Type from TypeLibrary
  1) Include Type in Schema-Plug-in
    1.a) getAllTypes-Type Explorer(This will include the types in the current library also).
  2) User Selects Include Type in Schema (Category rules are ignored for the time being)-Plug-in
    2.a) TypeDependencies.xml updated-Plug-in
    2.b) Add the corresponding type library jar into the classpath.-Plug-in
    2.c) genTypeBuildTypeLibrary-Codegen, The type name(this is the type which refers the new type from outside) will be passed.
    2.d) Modify the XSD-Plug-in C. Consuming Type From Service
  1) User selects "Inline type in WSDL" Context Menu-Plug-in
    1.a) getAllTypes-Type Explorer
  2) User selects a type to be added to the WSDL
    2.a) getXSDs(String typeName)—Codgen This gets all the XSDs either as an Array of Streams or Files,
    2.b) Model the XSD.-Plug-in creates an EMF model out of it.
    2.c) Updating the WSDL-Plug-in updates the WSDL EMF Model to include this newly created EMF Model.

In a particular embodiment, the Type Explorer, shown in FIGS. 3, 4, and 7, is used primarily to address the following issues:

1) Used by System components to find all the services used by a given type;
  2) Used by the Governance process to manage Type compliance and compatibility;
  2) Used to find all the depending type libraries and Services; and
  3) Used to find all the types on which a type depends.

In a particular embodiment, the Type Explorer can be constructed on demand and is a run time in memory model object. The Type Explorer can be exposed through an interface for the SOA plug-in and for other system components. This Type Explorer interface in a particular embodiment includes methods for implementing the following functionality:
  a) Populate the type registry with the details of a Library by passing the project root of the Type Library.
  b) Find details of the Type Libraries and the types stored in the Explorer.
  c) Find the dependent types for a given type. This dependency is in both the child and the parent direction.
  d) Methods for adding/deleting/updating information about individual types in the Explorer.
  e) Methods for specifying a new dependency for a type.
  f) Methods for syncing-up the Explorer with the underlying repository.

Customize Namespace to Java Package Mapping

Figure 14:
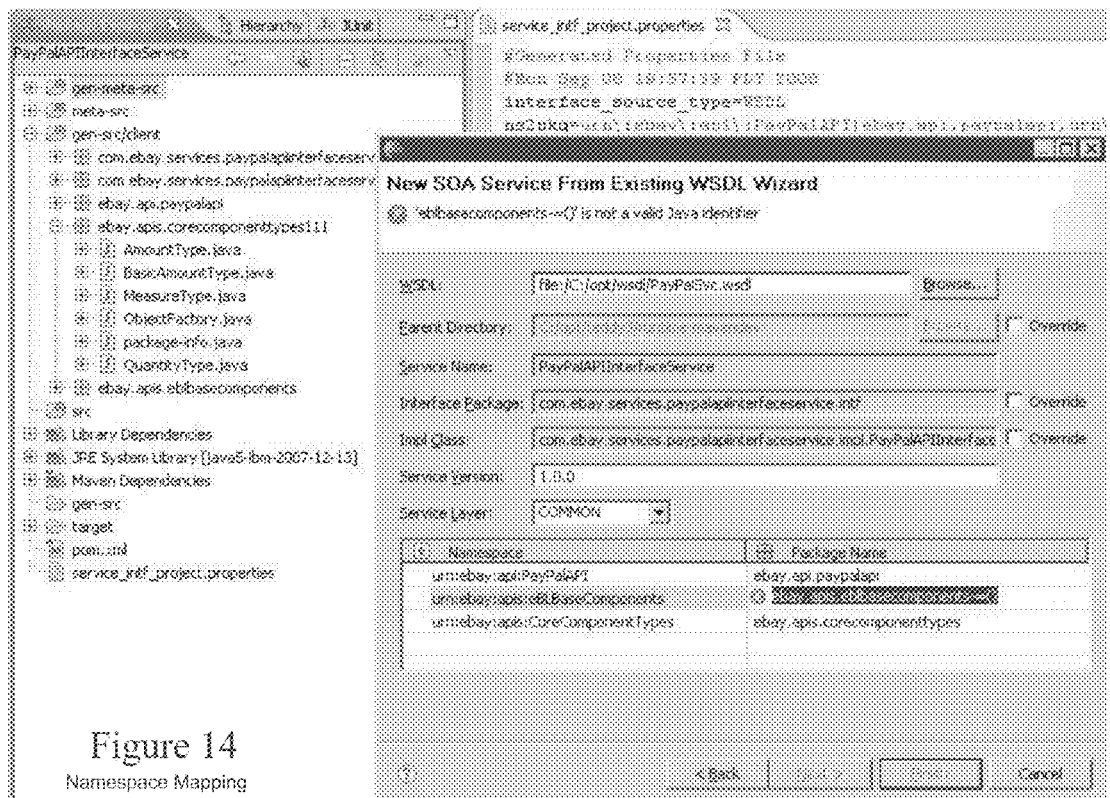
FIG. 14 illustrates an example of the namespace mapping used in an example embodiment.

In the host environment of a particular embodiment, When creating a service (or consumer) from a multiple namespaces WSDL file, we enable a user to specify the identity of a Java package to which each namespace should be mapped. In the new service/consumer from the existing WSDL wizard pages, a mapping table can be provided. After a WSDL is selected, the mapping table can be used to find all targetNamespaces from the Types schema element (including imported). Then, a function can be called to get the default package name for the namespace. In a particular embodiment, only the Package Name column can be edited, whereas the Namespace column cannot be edited. When modifying the package name, the validation logic can ensure that the modified package name follows the Java package name convention and the modified package name is unique across all existing package names. FIG. 14 illustrates an example of the namespace mapping used in an example embodiment.

Figure 15:
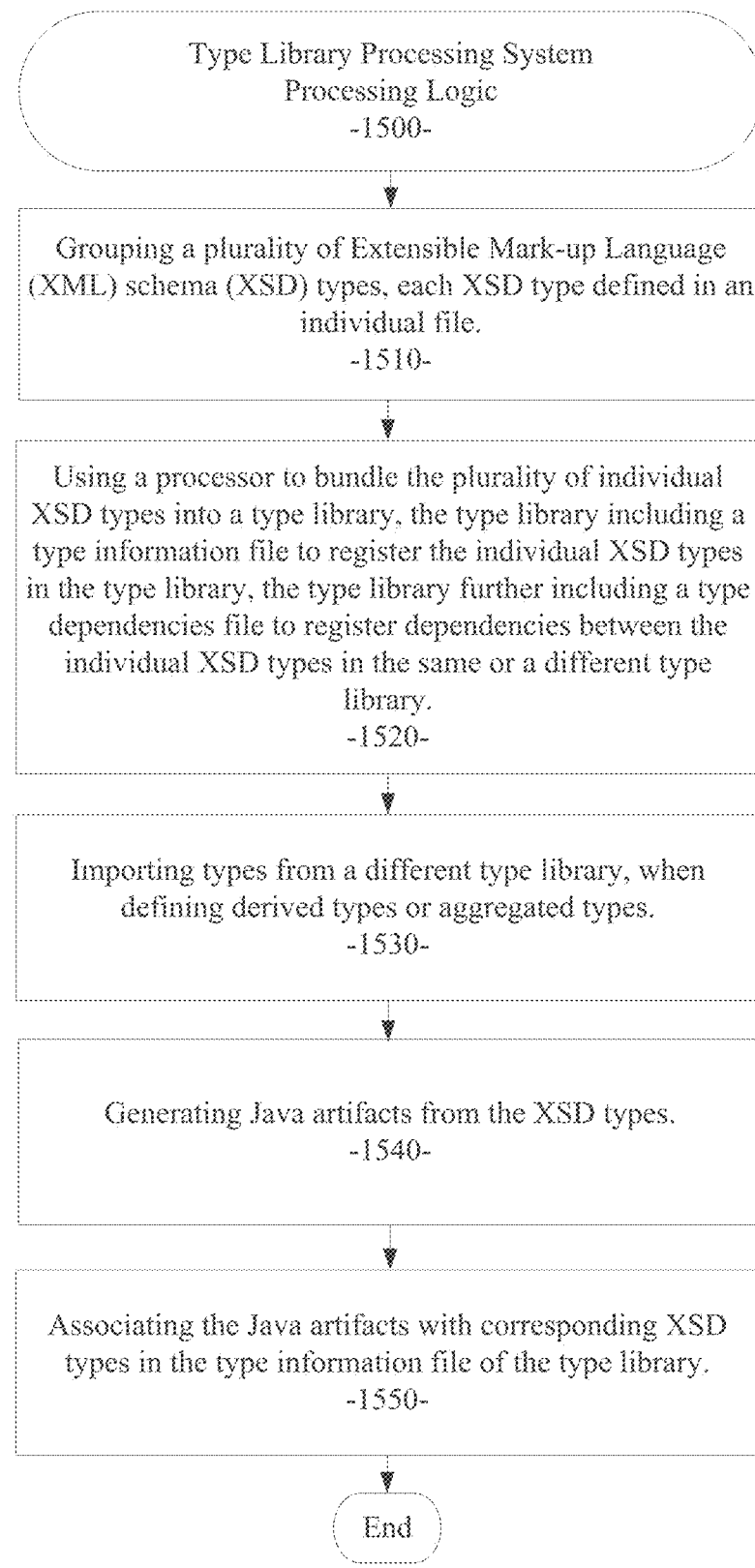
FIG. 15 illustrates a processing flow diagram for an example embodiment.

FIG. 15 is a processing flow chart illustrating an example embodiment of the type library processing system 1500 as described herein. The method of an example embodiment includes: grouping a plurality of Extensible Mark-up Language (XML) schema (XSD) types, each XSD type defined in an individual file (processing block 1510); using a processor to bundle the plurality of individual XSD types into a type library, the type library including a type information file to register the individual XSD types in the type library, the type library further including a type dependencies file to register dependencies between the individual XSD types in the same or a different type library (processing block 1520); importing types from a different type library, when defining derived types or aggregated types (processing block 1530); generating Java artifacts from the XSD types (processing block 1540); and associating the Java artifacts with corresponding XSD types in the type information file of the type library (processing block 1550).

Figure 16:
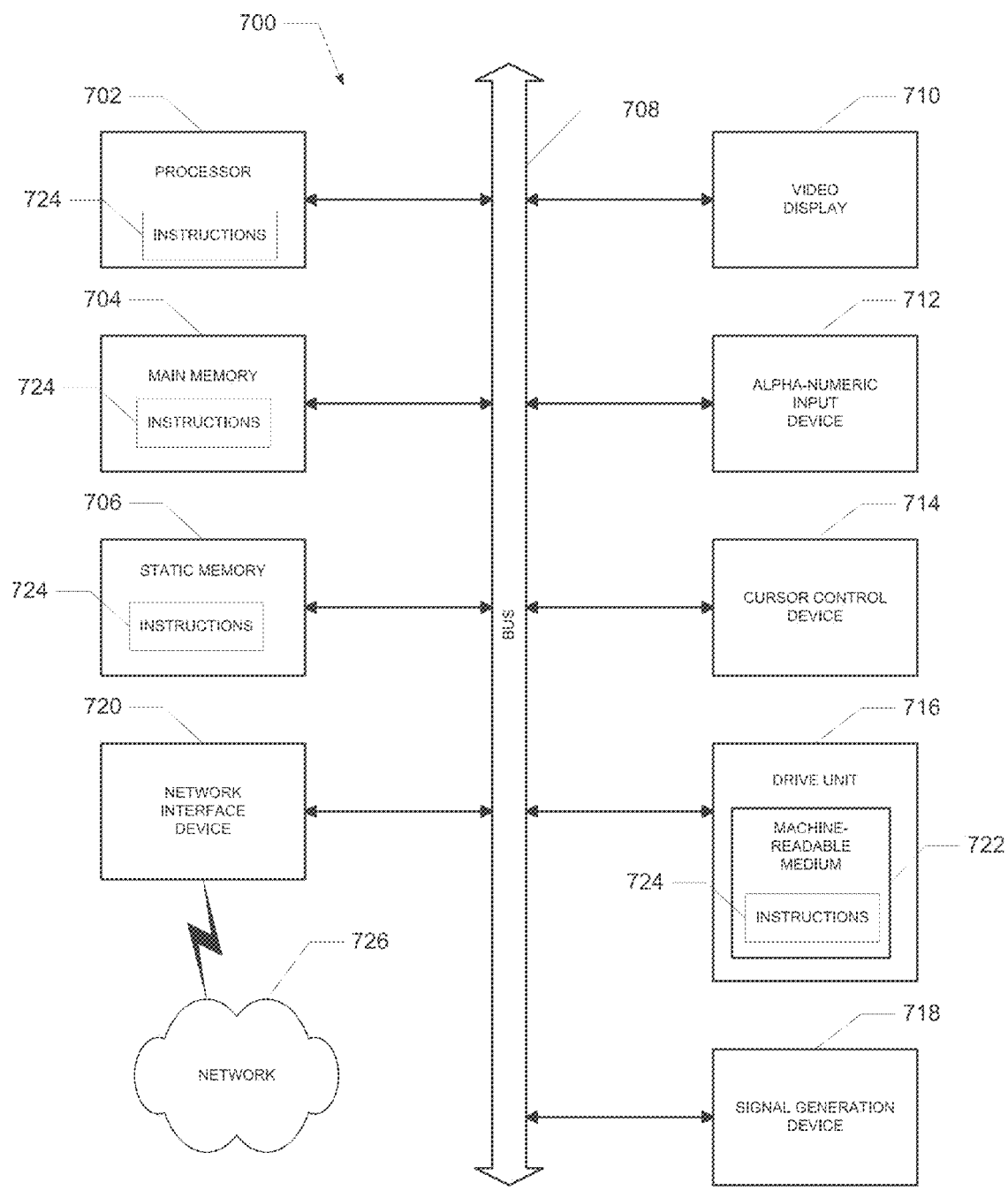
FIG. 16 shows a diagrammatic representation of a machine in the form of a computer system within which a set of instructions, for causing the machine to perform any one or more of the methodologies discussed herein, may be executed, according to an example embodiment.

FIG. 16 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, a computer-implemented system and method for creating, managing, and reusing schema type definitions in SOA services, grouped in the form of libraries are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A method comprising:
   storing definitions of a plurality of data types in a plurality of respective XML schema files contained in a plurality of type libraries, each type library including a type dependencies file specifying dependencies of data types defined within the library on data types defined within one or more other libraries; and
   in response to selection, by a developer of a service project, of one or more of the data types for use in the service project,
      automatically inlining the one or more selected data types into a document describing the service project;
      consulting the type dependencies files of the libraries of the one or more inlined data types to identify, among the one or more inlined data types, those data types from which Java files have previously been created; and
      compiling, among the one or more inlined data types, those data types from which Java files have not previously been created into Java files and storing the Java files in a service interface jar.

2. The method of claim 1, further comprising:
   in response to a change of one of the inlined data types in a library storing the XML schema file for that data type, notifying the document describing the service project of the change.

3. The method of claim 1, wherein the XML schema files are stored in plurality of type libraries grouped into a plurality of hierarchical layers, a first layer comprising one or more libraries each common to all services within an organization, a second layer comprising one or more libraries each common to all services within a specific domain within the organization, and a third layer comprising one or more libraries each common to a specific service.

4. The method of claim 1, wherein the document describing the service project is a Web Service Description Language document.

5. The method of claim 1, wherein automatically inlining the selected data types involves creating a temporary XML schema file aggregating the selected data types and inlining the temporary XML schema file.

6. The method of claim 1, wherein at least one of the type libraries contains multiple XML schema files, the multiple XML schema files within each library sharing a common name space.

7. The method of claim 1, comprising using a Java API for XML Binding (JAXB) compiler to compile the data types into Java files.

8. A system comprising:
   memory storing
      a plurality of type libraries that collectively contain definitions of a plurality of data types in a plurality of respective XML schema files, each type library including a type dependencies file specifying dependencies of data types defined within the library on data types defined within one or more other libraries; and
      a document describing the service project and having one or more data types inlined therein; and
   a plurality of modules comprising
      a code generation tool configured to
         consult the type dependencies files of the libraries of the one or more inlined data types to identify, among the one or more inlined data types, those data types from which Java files have previously been created; and
         compile, among the one or more inlined data types, those data types from which Java files have not previously been created into Java files and store these Java files in a service interface jar.

9. The system of claim 8, wherein the plurality of modules comprise a module configured to notify, in response to a change of one of the inlined data types in a library storing the XML schema file for that data type, the document describing the service project of the change.

10. The system of claim 8, wherein the plurality of type libraries are grouped into a plurality of hierarchical layers, a first layer comprising one or more libraries each common to all services within an organization, a second layer comprising one or more libraries each common to all services within a specific domain within the organization, and a third layer comprising one or more libraries each common to a specific service.

11. The system of claim 8, wherein the document describing the service project is a Web Service Description Language document.

12. The system of claim 8, wherein at least one of the type libraries contains multiple XML schema files, the multiple XML schema files within each library sharing a common name space.

13. The system of claim 8, wherein the code generation tool comprises a Java API for XML Binding (JAXB) compiler.

14. The system of claim 8, further comprising a plug-in configured to cause inlining of the one or more data types into the document describing the service project in response to selection of the data types by a developer of the service project.

15. An article of manufacture comprising a non-transitory machine-readable medium storing:
   a plurality of type libraries containing definitions of a plurality of data types in a plurality of respective XML schema files contained in a plurality of type libraries, each type library including a type dependencies file specifying dependencies of data types defined within the library on data types defined within one or more other libraries;
   instructions for carrying out a plurality of operations in response to selection, by a developer of a service project, of one or more of the data types for use in the service project, the operations comprising:
      automatically inlining the one or more selected data types into a document describing the service project;
      consulting the type dependencies files of the libraries of the one or more inlined data types to identify, among the one or more inlined data types, those data types from which Java files have previously been created; and
      compiling, among the one or more inlined data types, those data types from which Java files have not previously been created into Java files and storing the Java files in a service interface jar.

16. The machine-readable medium of claim 15, further comprising instructions to notify, in response to a change of one of the inlined data types in a library storing the XML schema file for that data type, the document describing the service project of the change.

17. The machine-readable medium of claim 15, wherein the XML schema files are stored in plurality of type libraries grouped into a plurality of hierarchical layers, a first layer comprising one or more libraries each common to all services within an organization, a second layer comprising one or more libraries each common to all services within a specific domain within the organization, and a third layer comprising one or more libraries each common to a specific service.

18. The machine-readable medium of claim 15, wherein the document describing the service project is a Web Service Description Language document.

19. The machine-readable medium of claim 15, wherein the instructions for automatically inlining the selected data types comprise instructions to create a temporary XML schema file aggregating the selected data types and to inline the temporary XML schema file.

20. The machine-readable medium of claim 15, wherein at least one of the type libraries contains multiple XML schema files, the multiple XML schema files within each library sharing a common name space.

\* \* \* \* \*